Feb. 23, 1954     C. L. EMERSON, JR., ET AL     2,670,292

METHOD OF ROASTING NUTS AND THE LIKE

Filed Sept. 15, 1950                              7 Sheets-Sheet 1

INVENTORS
ATT'YS.

Feb. 23, 1954  C. L. EMERSON, JR., ET AL  2,670,292
METHOD OF ROASTING NUTS AND THE LIKE
Filed Sept. 15, 1950  7 Sheets-Sheet 2

INVENTORS

INVENTORS

Feb. 23, 1954  C. L. EMERSON, JR., ET AL  2,670,292
METHOD OF ROASTING NUTS AND THE LIKE
Filed Sept. 15, 1950  7 Sheets-Sheet 4
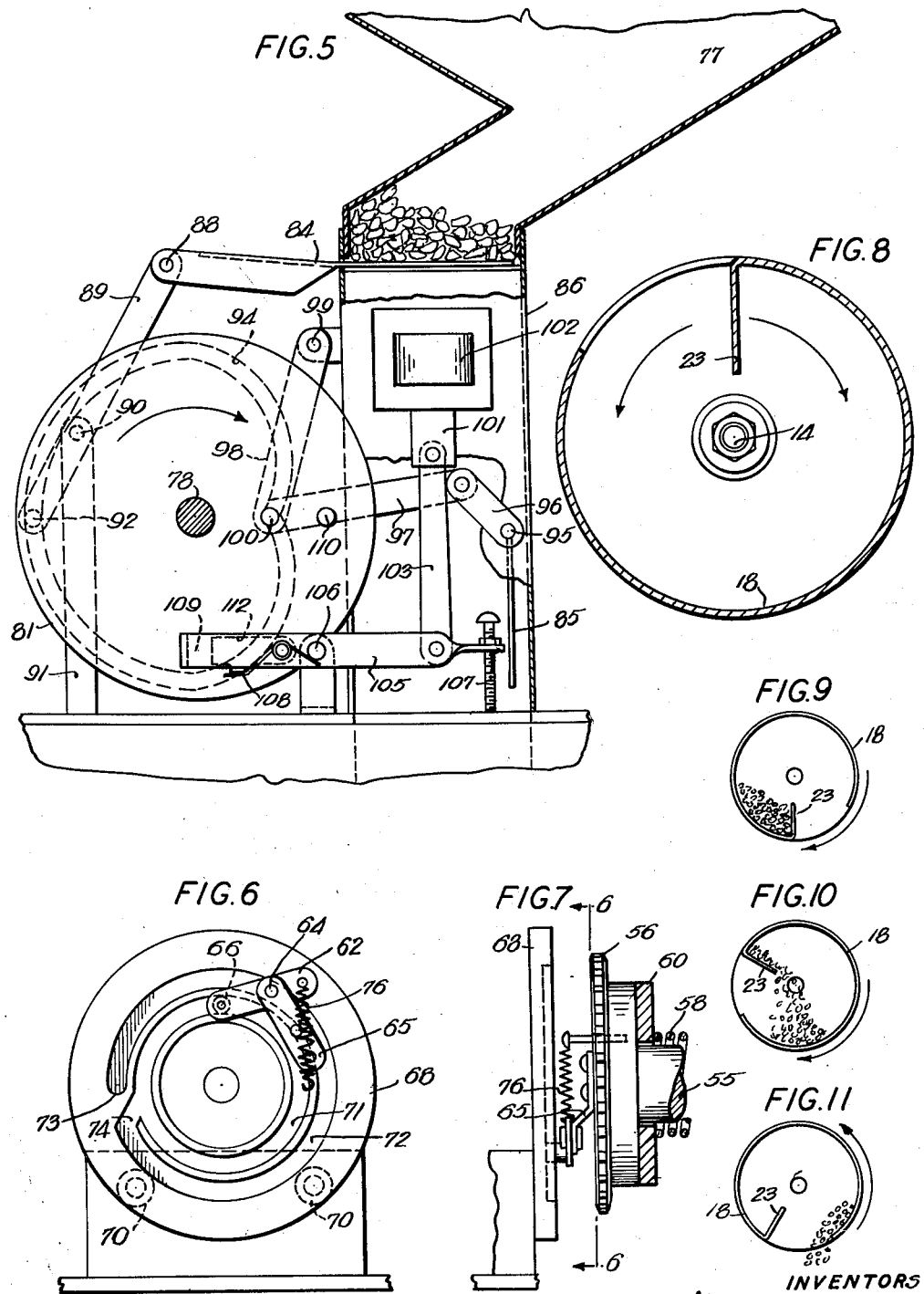

Feb. 23, 1954  C. L. EMERSON, JR., ET AL  2,670,292
METHOD OF ROASTING NUTS AND THE LIKE
Filed Sept. 15, 1950   7 Sheets-Sheet 5

INVENTORS
Cherry L. Emerson Jr. William R. Cumming
BY Newway, Jenney, Witter & Hildreth
ATT'YS.

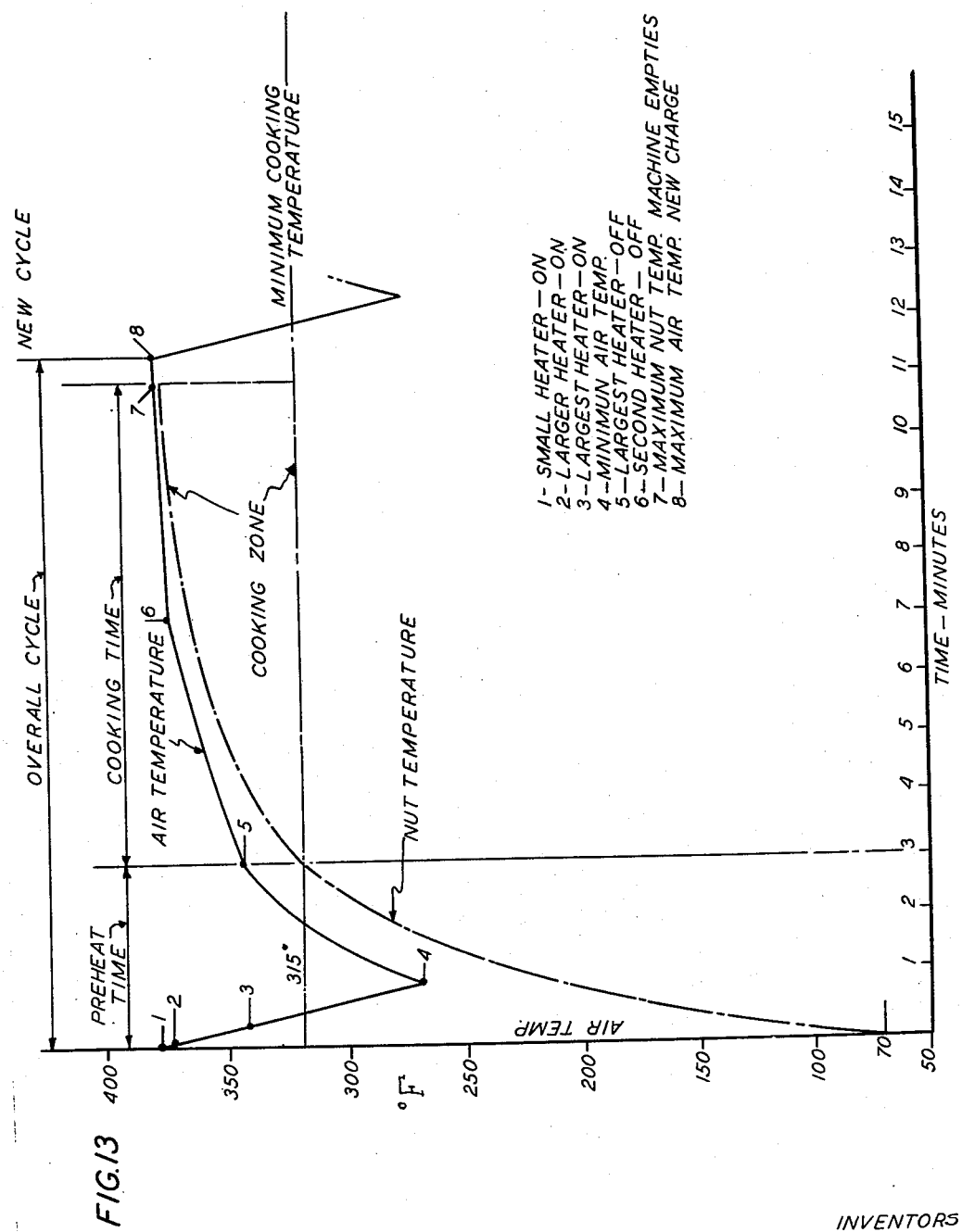

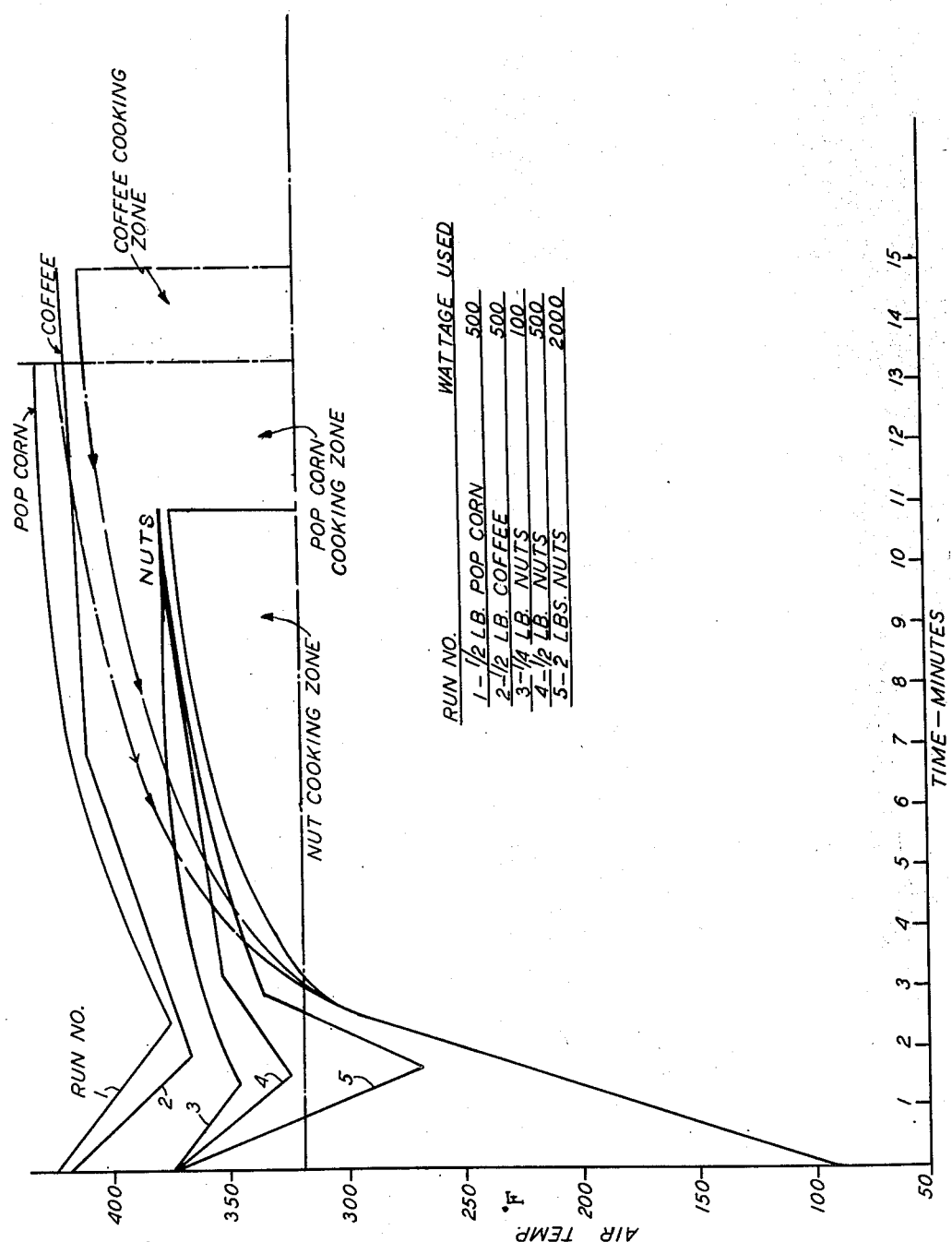

Patented Feb. 23, 1954

2,670,292

UNITED STATES PATENT OFFICE 2,670,292

METHOD OF ROASTING NUTS AND THE LIKE

Cherry L. Emerson, Jr., Newton Highlands, and William R. Cuming, Boston, Mass., assignors to Electricooker, Inc., Newburyport, Mass., a corporation of Massachusetts Application September 15, 1950, Serial No. 185,006

8 Claims. (Cl. 99—126)

This invention comprises a new and improved method for roasting nuts, coffee, popcorn and the like in heated air in a closed chamber, wherein the amount of heat supplied to the air for roasting is governed by the weight of material being roasted and by the temperature difference existing between the air in the roasting chamber and a pre-selected roasting temperature. The invention includes within its scope the novel apparatus herein shown for carrying out our novel method.

The roasting of nuts is an old art which has been the subject of many inventions. Methods have been devised for roasting nuts in oil and thermostatically controlling the temperature of the oil. Methods have also been devised for roasting nuts in hot gas and thermostatically controlling the gas temperature. Our invention contemplates the roasting of nuts and like products in hot air or other gases in a machine which operates automatically to roast perfectly varied sized batches by changing the temperature of the product along a predetermined temperature path without recourse to timing mechanism, turning out varying sized batches of the roasted product in similar time periods with each nut, coffee bean, or the like treated essentially the same as its neighbor, doing so without adjustment of the machine as the weight of the batch therein is varied.

Accordingly, the primary object of this invention is to provide a method for roasting nuts, coffee and the like which follows a predetermined pattern regardless of the amount of material being roasted in the machine and is independent of time to such an extent that widely varying weights of a given material can be handled in essentially the same time periods to produce a perfectly cooked product, the method being dependent solely upon the temperature difference which exists between the air in the roasting chamber and a pre-selected maximum roasting temperature, the temperature difference being established automatically in magnitude by the weight of material introduced into the machine.

We have discovered that at temperatures below about 315° F., nuts and the like can be maintained for considerable periods without appreciably cooking the nuts. Thus we describe 315° F. as the minimum cooking temperature. While this figure of about 315° F. for the minimum cooking temperature is offered as a general illustrative figure, it is given specifically for nuts and it is further true that coffee and popcorn, for instance, do not vary far from it. In other words, below the minimum cooking temperature, the cooking rate of a nut does not increase linearly with increase in temperature, and indeed increases hardly at all at a temperature increase of some 245° F. above room temperature. This is in sharp contrast to the behavior of many foods which can be cooked completely in a matter of seconds at a temperature some 150° F. above room temperature.

We have further discovered that above 315° F. the cooking rate of the nut takes a tremendous increase, and at temperatures of 375° F. to 425° F. the total cooking time is measured in seconds. Indeed at the minimum cooking temperature a chemical reaction is apparently triggered off wherein the effect of temperature level is completely different in kind from that at lower levels. Therefore, if a nut is carried to a temperature of 425° F. or much above, there is serious danger of over-cooking it or indeed burning it. Hence we always carefully restrict the nut temperature to a maximum in the neighborhood of 425° F.

In discovering these facts, we further found that if a nut is subjected to an air temperature of 265° to 375° F., only a short period of time, from 3½ to 3 minutes, is required before the temperature of the nut at its center approximates the air temperature. This we discovered by placing a thermocouple of fine iron-constantan wire directly at the center of the nut and recording the temperature changes as the nut heated up in the hot air.

Having made these essential discoveries, it became apparent that a nut can be heated at a very high rate without fear of injuring the nut, provided the skin temperature of the nut remains at or below the minimum cooking temperature. Since the minimum time in which the entire nut can be heated to 315° F. is about three minutes, however, it is clear that the optimum rate of heating during what can be described as the pre-heat period (that period when the nut is being heated from room temperature to minimum cooking temperature) is that which will bring the nut to such temperature in this time. The nut is then ready for cooking but is entirely uncooked.

In making the method practical in a machine which is handling a wide variation in the weight of batches being roasted, it is necessary to vary the rate of heat input as the weight of the batch is varied. Ideally this should be done by a device continually varying the heat input to the machine as the temperature of the heat exchange medium (the hot air or other gas used for roasting) varies from a predetermined set point which may be the maximum temperature of the roaster.

We have found however that it is more practical to add and cut out finite heat sources for certain periods of time in stepwise fashion and thus achieve a reasonable facsimile to an idealized continuous temperature path for the nut being heated in the air. In particular we have found it most preferable to add increasing increments of heat source to the heating system as the temperature of the cooking air falls from the maximum and to cut out decreasing increments as the air and nut temperatures rise together from the minimum cooking temperature. Thus we are able, automatically, to compensate for the almost negligible cooking rate of a nut below the minimum cooking temperature by adding larger and larger increments of heat to the system as the cooking air temperature falls and at the same time to compensate for the extraordinary increase in cooking rate above the minimum cooking temperature by cutting out the heat sources in decreasing increments as the air temperature rises. This not only insures that each nut, coffee bean, or the like, will be treated exactly alike along a predetermined almost ideal temperature path, but also provides an automatic safety feature in that as the temperature of the nut rises above the minimum cooking temperature and the cooking rate increases enormously, at that time, the heat supplied to the hot air becomes smaller and smaller in amount until the nut is raised to its final cooking temperature by use of a very small fraction of the heat which was supplied when the hot air was at its minimum temperature.

In the accompanying drawings we have illustrated both our method of cooking nuts and the like and a machine adapted automatically to cook such products in accordance with our invention. In these drawings:

Fig. 5 is an enlarged fragmentary view of a portion of Fig. 3,

Figure 1:
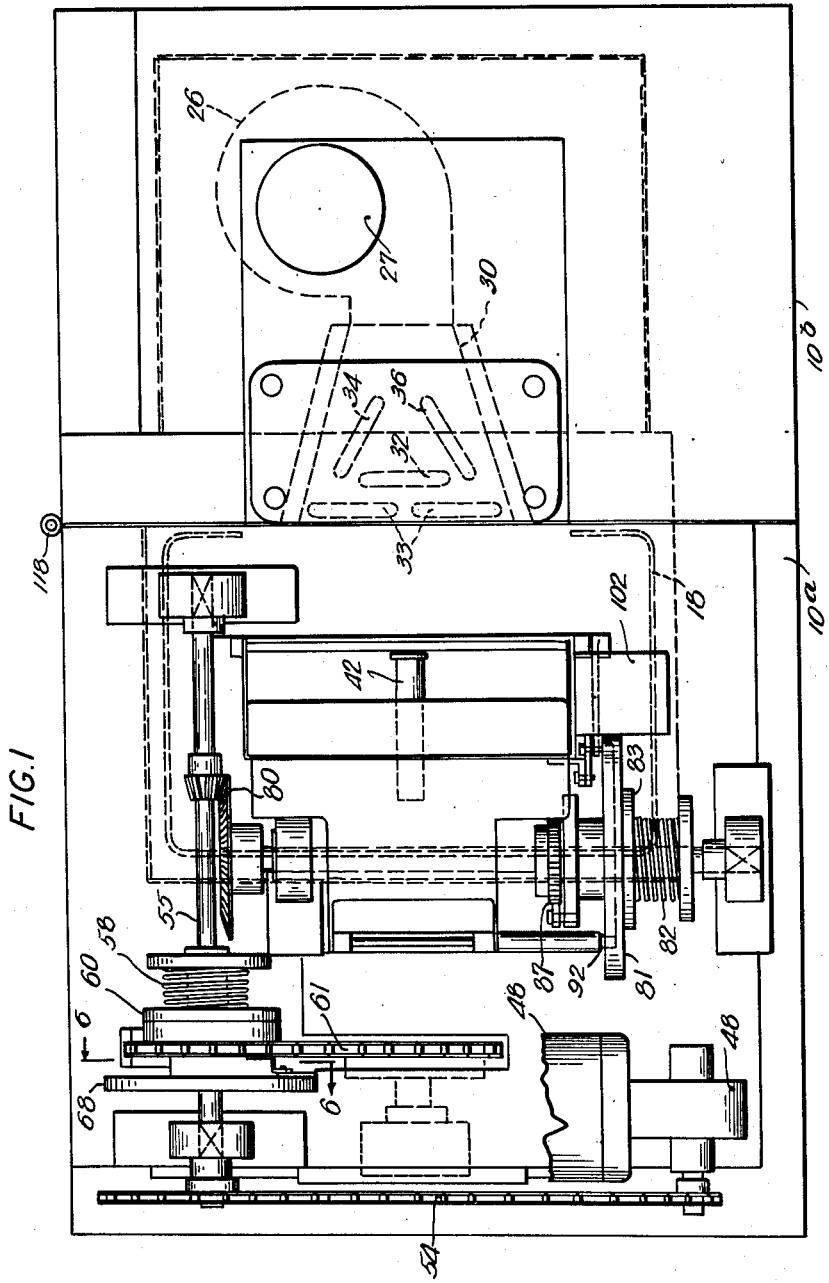
Fig. 1 is a plan view of the machine with the nut hopper removed.
Figure 2:
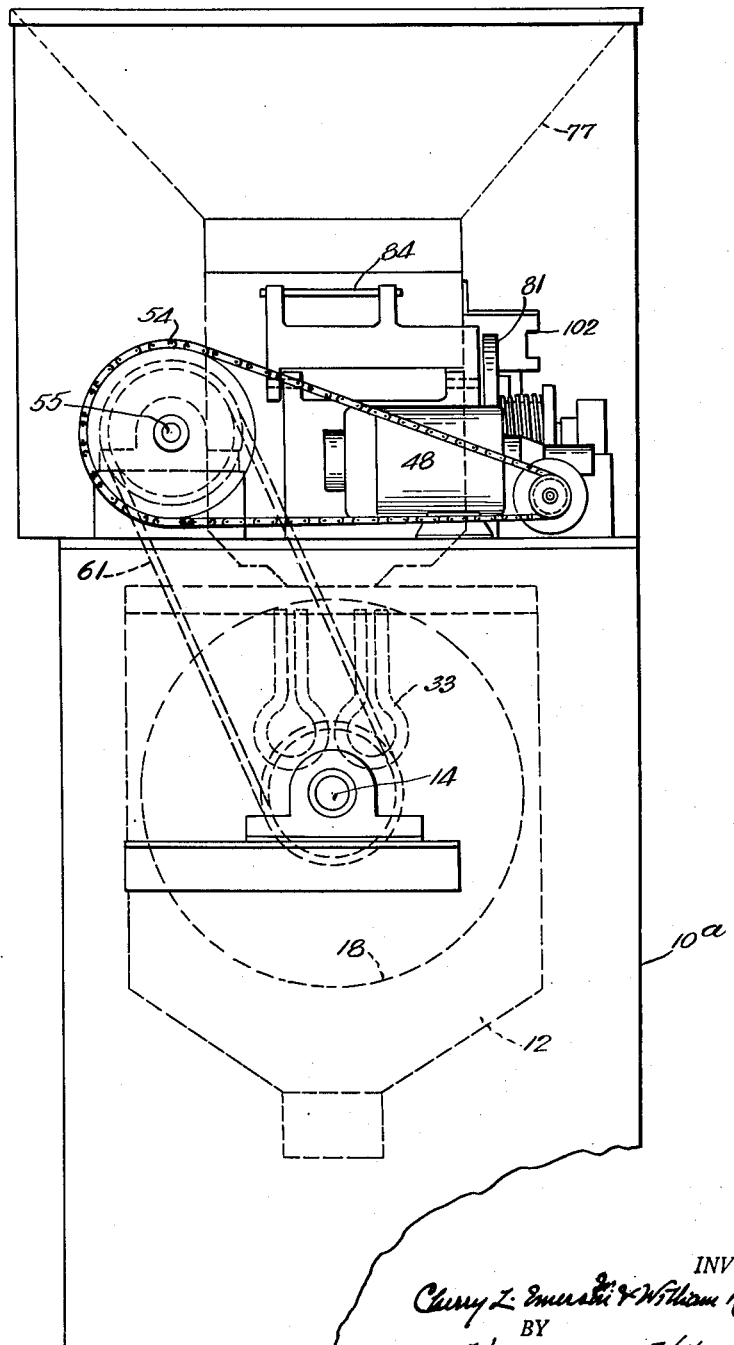
Fig. 2 is an end view of the machine.
Figure 12:
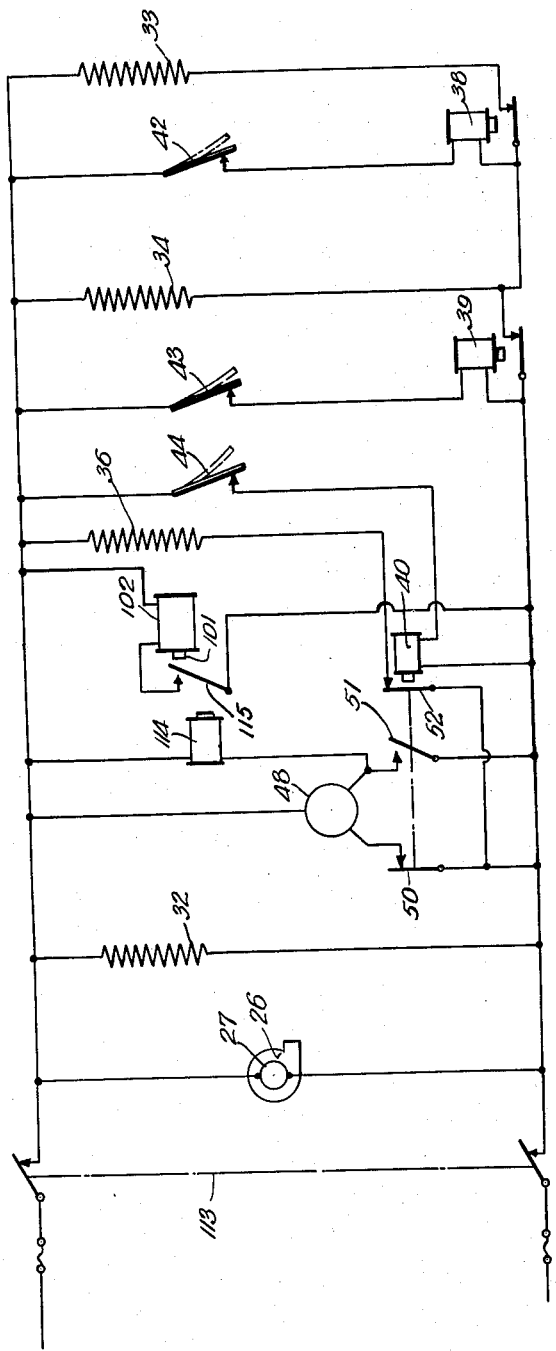

Fig. 6 is an enlarged fragmentary view taken on line 6—6 of Fig. 1 and showing a cam mechanism for operating the cooking drum in opposite directions for cooking and emptying the batch, Fig. 7 is a side view thereof, Fig. 8 is a transverse sectional view through the cooking drum, Figs. 9 and 10 show the cooking drum operating in the cooking direction, Fig. 11 shows the cooking drum operating in the reverse direction for emptying the batch, Fig. 12 is a wiring diagram of the automatic controls, Fig. 13 is a diagrammatic view graphically illustrating our improved method of roasting, and Fig. 14 is a like view illustrating the cooking of varied amounts of different products.

Recourse to Fig. 13 will make clear the method which we use for roasting nuts. It will be seen that when the nuts, coffee beans, or the like, are deposited in the roaster the temperature of the air begins to drop and thermally responsive means are provided for increasing the supply of heat when the temperature of the air reaches a predetermined point, (1). The nut temperature in the meantime is rising but is still far below the minimum cooking temperature. Hence as the air temperature in the roaster drops still further, thermally responsive means are provided for further increasing the supply of heat and in a much larger amount (2) than at the first step, and further on at (3) in a still larger amount.

If the nut has been heated from 70° F. to 315° F. in a period of three minutes, as indicated in Fig. 13, this represents a rate of temperature rise of 82° F. per minute during the pre-heat period. Since the cooking rate will now begin to rise enormously, any such continuted rate of temperature rise in the nut will, within a minute or two, burn the nut badly. It is necessary therefore to greatly reduce the rate at which heat is being transferred to the nut once the minimum cooking temperature has been reached and thermally responsive means are employed to do just this by now removing the major increment(s) of heat added during the early rise in nut temperature.

This is done in such a way as to insure that during the cooking period which follows, the rate of temperature rise of the air and nut both will follow a curve averaging about 5° F. per minute. Following this temperature path the material can be removed from the roaster in an additional seven or so minutes at a predetermined temperature of about 375° F. and will be perfectly cooked.

We have found, however, that it is preferable to vary the heat source of supply more than once during the cooking period itself and for the first few minutes have the temperature rise controlled between 8°–10° F. per minute, and in the last few minutes have the temperature rise not exceed about 2° F. per minute. In order to achieve this predetermined temperature path, thermally responsive means must be provided for cutting out the heat sources in just the right amount and at just the right time. This is all illustrated graphically in Fig. 13. Indeed, the number of such steps is not limited at all in theory but in practice we have found that three or four steps as shown in Fig. 13 will suffice to handle quite a wide variation in the weight of material introduced into the roaster. Even wider variations in weight are handleable, however, if more steps are added in the heat supply system. Not only must the number of steps be carefully picked, but also the amount of heat supplied at each step must be carefully considered in order to get the proper predetermined temperature path.

Further observation of Fig. 13 and also Fig. 14 will make another important discovery clear. Having pre-selected the maximum roasting temperature and predetermined the temperature path of the nut by selecting the settings for the various thermostats, it becomes evident that each nut, or the like, is subjected to a predetermined time-temperature integral while in the roaster. Below the minimum cooking temperature, the time-temperature integral is of no historical importance in the cooking of a nut or the like. We have discovered, however, that the time-temperature integral above the minimum cooking temperature is characteristic for a given material and that it is of importance to control it with reasonable precision, it being variable only with different types of material being roasted.

It seems worthwhile here to point out a well known rule in regard to chemical reaction rate. Generally speaking, chemical reaction rate is known to double with each approximate 10 degree rise in temperature. Indeed, the time-temperature integral above the minimum cooking temperature seems to correspond closely to this concept of increasing rate with temperature, but below the minimum cooking temperature no such relationship is apparent, although the normal expectation would be to find it here as well.

The cooking zone area in illustrative Fig. 13 calculates approximately 300° F. minutes above 315° F. and represents graphically the time-temperature integral to which we refer, being applicable to a nut only. As long as this predetermined integral is applied in constant fashion, the particular material will be perfectly cooked.

In Fig. 14 we have graphically illustrated the cooking of popcorn, coffee and nuts. Popcorn is cooked at a somewhat higher temperature than coffee and when a one-half pound load of either is deposited into the drum the air temperature drops sufficiently to turn on two heaters corresponding to heaters 33 and 34. Nuts cook at a lower temperature and when a quarter pound load is deposited into the drum the air temperature drops sufficiently to turn on the heater 33. When a one-half pound load is deposited into the drum the air temperature drops sufficiently to turn on the heaters 33 and 34. When a two pound load is deposited into the drum the air temperature drops sufficiently to turn on the heaters 33, 34 and 36. It will also be noted that at the temperatures employed, the cooking period is shortest for nuts and the longest for coffee.

It is obvious that the predetermined time-temperature integral can be held constant although both time of cooking and maximum roasting temperature are varied; indeed, one must be varied if the other is varied in order to keep the integral constant. We have found that it is more practical and effective to confine the maximum roasting temperature within the limits 335° F.–435° F., this variation being sufficient regardless of whether we are cooking nuts, coffee beans, popcorn, or the like, and to let the time of cooking be determined by the pre-selected path to maintain the proper time-temperature integral for the various materials.

It will be seen from Fig. 14 that the time-temperature integral for nuts above 315° F. is about 300° F.-minutes regardless of the weight of batch, while that for coffee, roasting at a maximum temperature of 410° F. along the pre-selected temperature path shown is about 750° F.-minutes, and that for popcorn, roasting at a maximum temperature of about 420° F. as shown is about 700° F.-minutes.

In roasting a given material, then, in accordance with our method, it is only necessary to select the maximum roasting temperature and then set the various thermostats to insure the necessary time-temperature integral above the minimum cooking temperature. The machine then operates automatically to produce the proper effect on each unit of the material and to turn out a perfectly cooked product. In other words, we achieve the critical effect of the time-temperature integral by simply selecting various proper temperature levels to apply or delete varying increments of heat.

It will be further understood that exact roasting conditions are a matter of taste, no hard and fast rule being possible. In one market, one time-temperature integral will apply, while in other markets other time-temperatures may be found more desirable because of preference for different texture, taste and color of the final product. Within reasonable limits each operator of our roasting machine can determine for himself the best integral for the material he is roasting.

It can be seen then that our method of roasting can be applied to one nut, one coffee bean, and the like, or to a large group of such nuts. If the proper mechanical means are supplied it is possible by the application of our method to cook a ton of nuts, treating each nut with the same rate of temperature rise, and to cook the ton of nuts in the same time required to cook one pound or less of nuts. The limitations of our method are in practice and not in concept.

Referring again to the drawings, 10 indicates the insulated walls of a chamber 12 and 12ª. A shaft 14 is supported in two bearings 15 and 16 and carries a receptacle 18 on its inner end within the chamber 12. This receptacle may be in the form of a drum, basket, etc. of any desired material capable of withstanding the temperature within the chamber. Hereinafter the receptacle is referred to as a drum or basket. The chamber 12 has a portion 12ª which is in communication with the interior of the drum through an opening 19 in the end wall and together they provide a cooking chamber 20. The drum also has an opening 22 through its peripheral wall and a portion of this wall is bent inwardly of the drum to provide a shelf 23, a corner portion of the shelf being bent upwardly at 24.

A blower fan 26 operated by a motor 27 is provided within the chamber 12ª adjacent to the open end of the drum. The fan is adapted to draw air from the chamber 12ª and force it through a conduit 30 into the drum, thereby effecting an air circulation in the cooking chamber as indicated by the arrows. A plurality of electric heaters 32, 33, 34 and 36 are provided in the conduit for heating the air discharged into the drum from the fan. The heater 32 is of about 300 watts capacity and is continuously energized during the operation of the fan for the purpose of maintaining the temperature of the roaster against surface heat loss. The heaters 33, 34 and 36 are of a capacity of about 800 watts, 400 watts and 100 watts respectively.

The heaters 33, 34 and 36 are actuated by solenoids 38, 39 and 40 under the control of thermostats 42, 43 and 44 respectively. The thermostats are disposed centrally within the drum 18 and are mounted on a tube 46 extending into the drum.

The machine is operated by a reversible motor 48. As shown in Fig. 12 the motor switches 50 and 51 are connected together and to the switch 52 of the heater 36. In the position shown in Fig. 12, the solenoid 40 holds the switches 50 and 52 in closed position and the switch 51 in open position, and the motor is operating forwardly. When the solenoid 40 is deenergized the switches 50 and 52 are opened and the switch 51 closed, and the motor is operated in the reverse direction.

The motor 48 is connected by a chain 54 to a sprocket on a shaft 55. A sprocket 56 is held frictionally on the shaft 55 by a spring 58 engaging a friction clutch 60 against the sprocket. A chain 61 drives the receptacle shaft 14 from the sprocket 56. A lever 62 is pivoted at 64 to an arm 65 fixed to the outer face of the sprocket 56. A roll 66 on one end of the lever engages in a groove in the adjacent face of a disk 68 fixed to the frame at 70. The groove has an inner annular portion 71 and an outer portion 72. The portion 72 has a dead end 73 and an opening 74 permitting passage of the roll 66 is provided between the two portions. A spring 76 normally pivots the lever in a direction moving the roll outwardly. The purpose of this mechanism, as hereinafter described, is to stop the receptacle 18 in a position to receive a fresh charge of nuts from the hopper 77.

A shaft 78 is driven from the shaft 55 by bevel gearing 80. A cam disk 81 is mounted frictionally on the shaft 78 and normally held in frictional driving engagement by a spring 82 operating on a friction clutch 83. A ratchet mechanism 87 is arranged to drive the friction clutch when the shaft 78 is driven rearwardly (direction of arrow, Fig. 5) and to ride freely when the shaft is driven forwardly. The function of this cam disk is to operate upper and lower gates 84 and 85 in the vertical portion 86 of the nut charging conduit, thereby automatically feeding measured charges of nuts into the drum 18.

The outer end of the gate 84 is pivotally connected at 88 to a lever 89 pivoted at 90 to a post 91. The other end of the lever carries a roll 92 engaging within a cam groove 94 in the disk 81. The gate 85 is disposed within the conduit 86 and is rigidly connected to a shaft 95 extending through the conduit. An arm 96 fixed to the shaft outside the conduit has its free end pivotally connected to one end of a link 97. The other end of the link is pivotally connected to a link 98 pivoted to the conduit at 99. The pivotal junction of the links 97 and 98 carries a roll 100 extending into the cam groove 94.

The core 101 of a solenoid 102 mounted on the conduit 86, is connected by a link 103 to one end of a lever 105 pivoted at 106, an adjustable stud 107 being provided to limit downward movement of this end of the lever under the action of a spring 108. The free end of the lever has a clip 109 to receive a pin 110 carried by the disk 81. A latch plate 112 pivoted to the lever is normally held in the position shown in Fig. 5 by the spring 108. The operation of this mechanism automatically to feed measured charges of nuts into the drum 18 is hereinafter described. The housing 10 is constructed in two sections 10ᵃ and 10ᵇ hinged together at 118, thus giving easy access to the drum 18 and the chamber 12ᵃ merely by opening the two sections about the hinge.

The operation of the machine is substantially as follows. The cooking chamber 20 is first brought up to cooking temperature and this is effected by closing the main switch 113. The thermostats 42, 43 and 44 thereupon immediately close the circuits through the solenoids 38, 39 and 40 whereupon the heaters 33, 34 and 36 become energized and the motor 48 drives the drum 18 forwardly. The heater 32 and blower motor 27 are in the main circuit and are active when the main switch is closed. The hopper 77 can be filled with nuts during this heating up period.

Assuming that the thermostats 42, 43 and 44 are set to function at 315-325° F., 340-355° F. and 350-375° F., they operate as follows. When the temperature in the chamber reaches 325° F. the solenoid 38 is de-energized and the circuit to the heater 33 opens. The circuits to heaters 34 and 36 are likewise opened when the temperature reaches 355° F. and 375° F. Opening of the switch 52 also opens the motor switch 50 and closes the switch 51, thereby reversing the motor 48 and driving the sprocket 56 and drum 18 in the reverse direction. The follower roll 66 thereupon passes into the channel 72 (Fig. 6) and stops the sprocket and drum when the follower engages the abutment 73, it being noted that the receptacle 18 must rotate in reverse direction through at least one revolution while the follower roll is in the channel 72. In this stop position the opening 22 of the receptacle is disposed beneath the nut charging conduit 86 in position to receive a charge of nuts. The friction clutch 60 permits the sprocket 56 to stop while the motor and shaft 55 continue to rotate.

Figure 3:
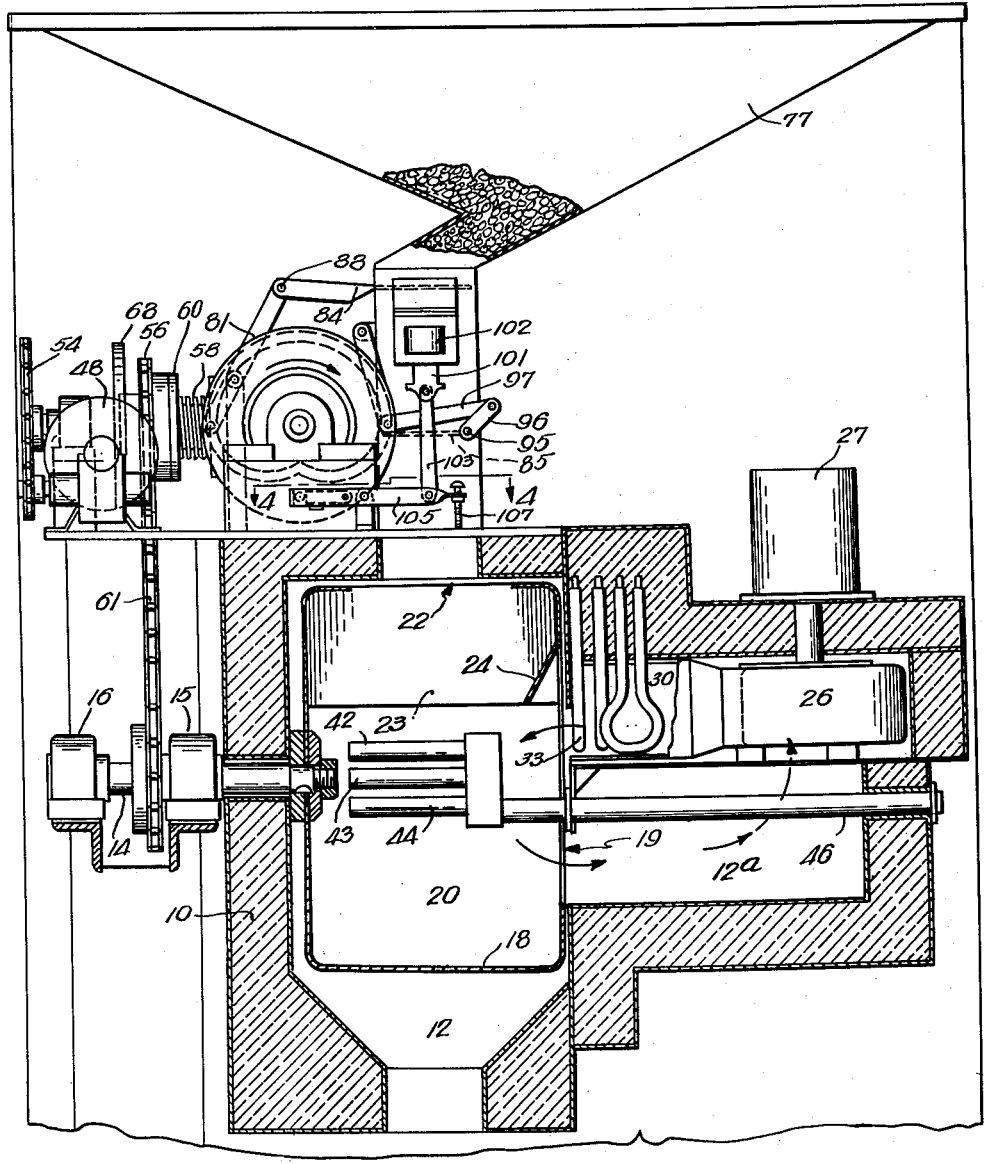
Fig. 3 is a view in elevation with the housing shown as broken away.
Figure 4:
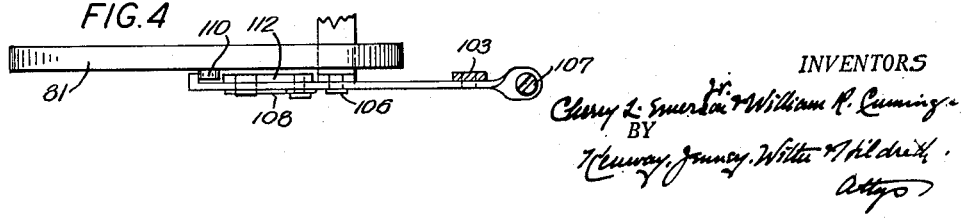
Fig. 4 is a plan view of a detail.

During the forward rotation of the drum 18 the cam disk 81 is in the position of Fig. 3 and is held against rotation by the engagement of the pin 110 within the opening 109 in the lever 105. Closing of the motor reversing switch 51 energizes a solenoid 114 and closes the switch 115 of a time delay relay which is set automatically to open the switch 115 in ten seconds. The switch 115 is in series circuit with the solenoid 102 whereby the solenoid is energized and the lever 105 raised from engagement with the pin 110.

The cam disk 81 thereupon makes one complete rotation from the position of Fig. 3 in the direction of the arrow (Fig. 5) and progressively performs the following functions: (1) opens the gate 84, (2) closes the gate 84, (3) opens the gate 85, and (4) closes the gate 85, thereby depositing a measured quantity of nuts into the drum 18. The switch 115 opens and the solenoid 102 is de-energized before this rotation of the cam disk is completed, and the pin 110 depresses the latch 112 and stops against the clip 109, thereby again locking the disk 81 in the position shown in Fig. 3, whereupon friction clutch 83 slips until motor reverses into the forward direction.

The depositing of the charge of nuts into the drum 18 causes a drop in the cooking air temperature within a period approximating two to ten seconds, the amount and period of the temperature drop depending upon the size of the charge deposited, as indicated in Fig. 14. When the dropping air temperature reaches 350° F., the thermostat 44 energizes the solenoid 40 and closes switches 50 and 52 and opens switch 51; thereby energizing the heater 36 and rotating the motor 48 and drum 18 forwardly, the follower roll 66 thereupon passing into and remaining in the channel 71 during the forward rotation. The heaters 34 and 33 are in like manner energized by the thermostats 43 and 42 when the air temperature reaches 340° F. and 315° F. respectively. Thus the air temperature drop is compensated for by applying progressively increasing increments of heat to the air in the chamber as the temperature therein drops. This operation results in quickly bringing the air back to cooking temperature.

As the drum rotates forwardly through the cooking period, the shelf 23 lifts the nuts in the drum (Figs. 9 and 10) and drops them from the front margin of the shelf by gravity as the shelf moves across the axis of drum rotation. The heaters and blower are disposed in the secondary chamber 12ᵃ in position to circulate air across the heaters and through the nuts falling from the shelf, thus giving maximum contact of the heated air with the nuts.

When the temperature in the cooking chamber, rising from minimum, reaches 325° F. the solenoid 38 is de-energized by the thermostat 42 and the circuit to heater 33 is opened. The thermostat 43 likewise de-energizes the solenoid 39 and opens the circuit to the heater 34 when the temperature reaches 355° F. When the temperature reaches 375° F. the thermostat 44 de-energizes the solenoid 40 and opens the switches 50 and 52 and closes the switch 51, thereby cutting off the heater 36 and reversing the motor 48. The drum 18 is thereupon rotated rearwardly and discharges the nuts (Fig. 11) and a new charge of nuts is thereafter deposited into the drum in the manner above described, and the machine then repeats the cooking cycle.

The numerous advantages of the method and machine comprising our invention will now be apparent. The machine is entirely automatic and requires an operator only to keep the hopper filled and the cooked nuts removed. Regardless of the size of batch, all nuts will be cooked exactly the same, over the same predetermined temperature path and discharged at the same temperature. A variety of materials can be roasted by pre-selecting the temperature path, thereby giving the machine real versatility. The machine can be made large or small depending upon the heater wattage or other heat capacity built into it and can therefore be made adaptable to either retail or wholesale roasting operation. The built-in safety feature furthermore makes loss from overcooking entirely negligible. Moreover, the elimination of oil, or the like, as a heat transfer medium has many advantages in itself. Labor in handling the oil and cleaning the machine is eliminated, odor from decomposition of the oil is likewise eliminated. While we have herein particularly described the roasting of nuts and the like in hot air it will be understood that the employment of other gases as the roasting medium is wholly within the scope of the invention.

From the foregoing description and attached figures, etc., it is clear that our method for roasting nuts and the like may be summed up in the following way, wherein the listed steps are not necessarily chronological but in summation add up to the method in essence:

1. Always introducing the cold charge of nuts, coffee beans, and the like, into a roaster which is at maximum temperature.

2. Applying heat progressively as the air temperature in the roaster drops.

3. Applying progressively increasing increments of heat as the roaster temperature drops.

4. Progressively decreasing the supply of heat as the temperature in the roaster rises from the minimum temperature.

5. Decreasing the heat supply in decreasing increments as the temperature rises from the minimum.

6. Removing some 65% of the heat supplied for preheating when roaster temperature reaches the minimum cooking temperature.

7. Removing 80-90% of the heat supplied for roasting when the roasting temperature has reached a point 30-35° F. above the minimum cooking temperature.

8. Finishing the roasting period by raising the roaster temperature to its maximum by use of the remaining 10-20% of the heat supplied for roasting (amounting to some 8% of the total supplied for preheating).

9. Automatically discharging the cooked material from the roasting chamber at the maximum roasting temperature.

10. Compensating for a large temperature drop in the roaster by increasing the heat supplied to the roaster.

11. Compensating for increasing temperature drop in the roaster by adding increasing increments of heat to the heat supply.

12. Compensating for a very low cooking rate below the minimum cooking temperature by raising the nut temperature at a very high rate during the preheating time.

13. Compensating for a marked acceleration in cooking rate above the minimum cooking temperature by decreasing the heat supplied for cooking in decreasing increments.

14. Supplying the overwhelming quantity of heat only after the temperature in the roaster has dropped below the minimum cooking temperature, thereby providing an automatic safety factor in controlling nut temperature.

15. Supplying a quantity of heat to the roaster which quantity is automatically predetermined by the weight of nuts added to the roaster, being automatically small in the case of a small weight of nuts and increasing progressively to a larger amount with a larger weight of nuts.

16. Supplying a quantity of heat to the roaster which quantity is automatically predetermined by the temperature deviation from the fixed maximum temperature, being small in case of a small deviation and becoming larger as the deviation from the maximum becomes larger, the deviation in all cases of roasting being determined by the cold material added to the roaster.

17. Controlling the total heat supply to the roaster as a function of the temperature of the entering nut charge, being automatically decreased as the temperature of the entering nut charge increases, thereby providing precise adherence to the predetermined temperature path regardless of the degree of preheat to which the nut is subjected outside the roaster.

Having thus disclosed our invention what we claim as new and desire to secure by Letters Patent is:

1. A method of roasting nuts in heated air in a closed chamber, which consists in heating the air in the chamber to nut cooking temperature, depositing into the chamber a batch of nuts at relatively lower temperature whereupon the chamber air temperature drops substantially, compensating for said temperature drop by applying progressively increasing increments of heat to the air in the chamber as the temperature thereof drops, and progressively decreasing the supply of heat to the air as the temperature thereof rises from the minimum.

2. The method defined in claim 1 in which said decrease of the supply of heat is effected in progressively decreasing increments as the temperature of the air in the chamber rises above a temperature approximating minimum cooking temperature.

3. The method defined in claim 2 including a decrease of more than 30% in said supply of heat when the nuts in the chamber reach a temperature approximating the minimum cooking temperature.

4. The method defined in claim 3 including a total decrease exceeding 90% in said supply of heat when the air in the chamber reaches a temperature approximating 10° below the maximum cooking temperature.

5. The method defined in claim 1 in which said decrease of the supply of heat is effected in progressively decreasing increments as the temperature of the air in the chamber rises above a temperature approximating minimum cooking temperature, including a decrease of more than 30% in said supply of heat when the nuts in the chamber reach a temperature approximating minimum cooking temperature, and including a total decrease exceeding 90% in said supply of heat when the air in the chamber reaches a temperature approximating 30° to 35° F. above minimum cooking temperature.

6. A method of roasting nuts in heated air in a closed chamber, which consists in heating the air in the chamber to nut cooking temperature, depositing into the chamber a batch of nuts at relatively lower temperature whereupon the chamber air temperature drops substantially, compensating for said temperature drop by applying progressively increasing increments of heat to the air in the chamber as the temperature thereof drops, decreasing the supply of heat to the air as the temperature thereof rises from the minimum including compensating for a marked acceleration in cooking rate above the minimum cooking temperature by decreasing in progressively decreasing increments the heat supply as the temperature of the air rises above minimum cooking temperature, circulating the air in contact with the nuts in the chamber during the heating and cooking operations, automatically discharging the batch from the chamber when the air in the chamber reaches a predetermined maximum cooking temperature, and depositing into the chamber a succeeding batch of nuts or the like at said relatively lower temperature.

7. The method defined in claim 1 in which the nuts are initially heated at a rate raising their temperature approximately 82° F. per minute for a period approximating three minutes, after which the temperature of the nuts is raised at a rate approximating 10 to 12° F. per minute for a period approximating three minutes, after which the temperature of the nuts and the like is raised to a final cooking temperature at a rate approximating 2 to 3° F. per minute for a period approximating five to eight minutes.

8. A method of uniformly roasting batches of nuts for uniform time periods in heated air in a closed chamber and in a predetermined temperature pattern adapted to roast each nut uniformly the same regardless of the weight of nuts in the batch being roasted, which consists in heating the air in the chamber to nut cooking temperature, depositing into the chamber a batch of nuts at relatively lower temperature whereupon the chamber air temperature drops an amount proportional to the weight and temperature of the deposited nuts, supplying additional heat to the air in the chamber in progressively increasing amount as the temperature thereof drops, and reducing said supplying of additional heat in progressively decreasing amount as the temperature of said air rises from a minimum, whereby the nuts of all batches roasted in the chamber are subjected to a uniform cooking treatment.

CHERRY L. EMERSON, Jr.
WILLIAM R. CUMING.

References Cited in the file of this patent

UNITED STATES PATENTS

| Number | Name | Date |
| --- | --- | --- |
| 1,908,059 | Sawin | May 9, 1933 |
| 2,109,597 | Richeson | Mar. 1, 1938 |
| 2,277,485 | Frazier | Mar. 24, 1942 |
| 2,301,922 | Atti | Nov. 17, 1942 |
| 2,522,448 | Husk et al. | Sept. 12, 1950 |